United States Patent [19]

Grele

[11] Patent Number: 5,396,972
[45] Date of Patent: Mar. 14, 1995

[54] FRICTION MATERIALS

[75] Inventor: Bruno Grele, Smithville, Tenn.

[73] Assignee: Ferodo America, Inc., Smithville, Tenn.

[21] Appl. No.: 214,369

[22] Filed: Mar. 17, 1994

[51] Int. Cl.6 .............................................. F16D 69/00
[52] U.S. Cl. .............................. 188/250 G; 188/250 B
[58] Field of Search ........... 188/250 B, 250 D, 250 E, 188/250 G, 251 A, 251 M, 73.1, 73.36, 73.37; 192/107 M; 156/315

[56] References Cited

U.S. PATENT DOCUMENTS

| | | | |
|---|---|---|---|
| 3,477,551 | 11/1969 | Beuchle et al. | 188/250 B |
| 3,751,330 | 8/1973 | Gilbert | 188/251 A |
| 3,767,018 | 10/1973 | Gordon | 188/250 G |
| 4,004,061 | 1/1977 | Creighton et al. | 156/315 |
| 5,089,962 | 3/1992 | Furusu et al. | 188/251 A |
| 5,199,540 | 4/1993 | Fitzpatrick-Ellis et al. | 192/107 M |
| 5,305,864 | 4/1994 | Strohm | 192/167 M |

FOREIGN PATENT DOCUMENTS 16222 of 1904 United Kingdom ............ 188/250 R

Primary Examiner—Robert J. Oberleitner
Assistant Examiner—Chris Schwartz
Attorney, Agent, or Firm—Synnestvedt & Lechner

[57] ABSTRACT

A disk brake pad and backplate assembly comprises a metal backplate formed with a number of abutments projecting from one face thereof, and a disk brake pad of a fully cured friction material composition, one face of said disk brake pad being provided with recesses wherein said abutments are received, together with a layer of an elastomeric adhesive to bond said pad to said backplate.

5 Claims, 2 Drawing Sheets

FRICTION MATERIALS

FIELD OF THE INVENTION

This invention relates to friction materials. More specifically it is concerned with disk brake pads of the kind commonly used in automotive disk brake applications.

BACKGROUND

A conventional automotive disk brake pad comprises a metal backing plate to which is attached a pad or block of a friction material. The mode of attachment varies according to circumstances. One method which is in wide use is based on previously prepared friction material pads. The raw materials for the pad including resin binders, are compounded, usually in powder or dough form, and thereafter compacted in a molding tool, under heat and pressure until the pad binder system has fully cured to form a rigid block. This block is then surface ground, to remove flash and to flatten its opposed front and back faces. It is then drilled and countersunk prior to rivetting onto a previously drilled backplate.

Another method which is in fairly wide use is to prepare a disk brake pad as a partially compacted and partially uncured preform. In such a preform, the resin binders are partially cured. A metal backing plate with several apertures in it is prepared, first by cleaning and then by coating with an adhesive, the latter being normally subjected to a heat treatment effective to dry the adhesive and cause it to partially cure, (commonly referred to as "B-stage" curing.) The pad preform is placed onto the adhesive coating and compacted to its final size and density through the application of heat and pressure. During this operation, some of the preform material is extruded into the apertures in the backplate, thereby keying the pad and plate together. Also, the adhesive is caused to set, bonding the shaped preform firmly to the backplate, without the need for rivets. Such assemblies are referred to as integrally molded.

A problem with conventionally manufactured disk brake pads is noise generated by the braking action. Several proposals for alleviating the problem are known. For example, one can fit a shim between the brake pad and the associated caliper. The shim is in the form of a thin metal sheet or layer coated on at least one face with a rubber composition. The latter acts as a damping element for the purpose of sound transmission/generation. However, the manufacture of suitable shims is an extra production process; their inclusion into the brake assembly is generally inconvenient. Also, it is possible for the shims to be omitted inadvertently during servicing operations.

OBJECTS OF THE INVENTION

It is an object of the present invention to provide a disk brake pad exhibiting improved noise performance. More particularly it is an object of the present invention to simplify manufacture of a disk brake pad.

SUMMARY OF THE INVENTION

This invention contemplates a disk brake pad and backplate assembly comprising a metal backplate formed with a number of abutments projecting from one face thereof, and a disk brake pad of a fully cured friction material composition, one face of said disk brake pad being provided with recesses wherein said abutments are received, together with a layer of an elastomeric adhesive to bond said pad to said backplate. The abutments are preferably in the form of a small number of raised portions of circular cross-section. Conveniently these abutments are made during blanking of the backplate, using tooling which embosses the backplate so as to generate recesses in one face of the backplate and corresponding relatively raised portions constituting the abutments on the opposite face. Generally speaking, the optimum number of abutments will be in the range two to five, with a typical diameter on the order of ⅜ to ½ inch. The optimum height of the abutments relative to the rest of the backplate will usually be in the range 1/16 to ⅛ inch, depending on the end use.

Manufacture of the pad of friction material is essentially conventional. Thus commonly used friction material ingredients are selected from, for example, phenolic and other resins, rubbers, reinforcing fibers such as steel, aramid, cotton and/or viscose, together with mineral fillers, graphite and powdered metal. A chosen mix of these is then compounded and molded under heat and pressure into a disk brake pad. This pad is then finished by grinding off molding flash and surface defects. In accordance with the present invention, the pad is then drilled or otherwise machined to develop recesses corresponding to the abutments on the backplate.

Preparation of the backplate is carried out in the usual way, by de-greasing and sandblasting to remove surface detritus. Corrosion inhibitors may be applied to the backplate by dipping or spraying prior to affixing a disk brake pad to one face of the plate. In accordance with this invention, an elastomeric adhesive is applied to that face of the disk brake pad to which the previously prepared disk brake backplate is to be affixed. The elastomeric adhesive may be a nitrile-phenolic resin adhesive and for optimum adhesion it has been found that it should be applied as a series of relatively thin layers.

Thus, according to a further aspect of the invention, a process for manufacturing a disk brake pad and backplate includes the steps of applying an elastomeric adhesive to one face of the disk brake pad as a series of relatively thin layers, each layer being dried by heating to partially cure the resin before succeeding layers are applied. By "relatively thin" in this present context is meant a total adhesive layer thickness on the order of not more than 0.2 inch and preferably only 0.15 inch. Surprisingly it has been found that such a layer, formed by the successive deposition and partial curing of three or four, or more, much thinner layers is surprisingly effective as a means of reducing brake noise. Furthermore, the novel pad/backplate construction of this invention results in acceptable bond integrity between the disk brake pad and the backplate. Whilst not wishing to be restricted by the following analysis of the invention, it is believed that at least one underlying reason for the improved noise performance is the use of the elastomeric adhesive to provide a constrained damping layer between the disk brake pad and the backplate, both of which are relatively stiff in comparison to the adhesive layer at their interface. The absence of rivets mechanically locking the parts together may be another important factor.

It will be appreciated that by forming the recesses in the face of the pad prior to applying adhesive, the latter is also applied to the recesses. The presence of adhesive in the recesses may prove advantageous in that the abutments formed in that face of the backplate which is to be bonded to the disk brake pad are also exposed to adhesive during the bonding operation, which is carried out under heat and pressure sufficient to cure the adhesive. Some flow of resin may in fact occur during bonding, thereby tending to enhance the totality of the coating, by more uniformly distributing adhesive over the confronting surfaces, including the abutments engaged in their corresponding recesses.

DESCRIPTION OF PREFERRED EMBODIMENTS

Further aspects of the invention will be apparent from the following description of preferred embodiments, with particular reference to the accompanying drawings, in which FIG. 1 is a perspective view of a disk brake backplate configured in accordance with the invention and showing that face of the backplate which is to be attached to a disk brake pad of a friction material, FIG. 2 is a perspective view of the opposite face of the disk brake backplate of FIG. 1, FIG. 3 is a perspective view of a disk brake pad of a friction material, configured for attachment to the backplate of FIGS. 1 and 2 and in particular for attachment to that face of the backplate shown in FIG. 1, FIG. 3A shows a side view of a portion of the disk pad of FIG. 3.

Figure 1:
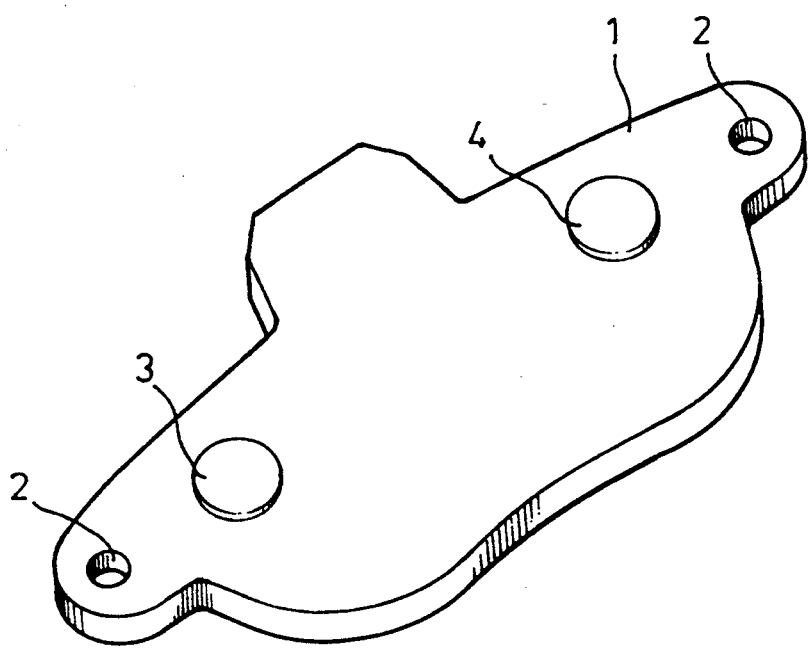
Figure 2:
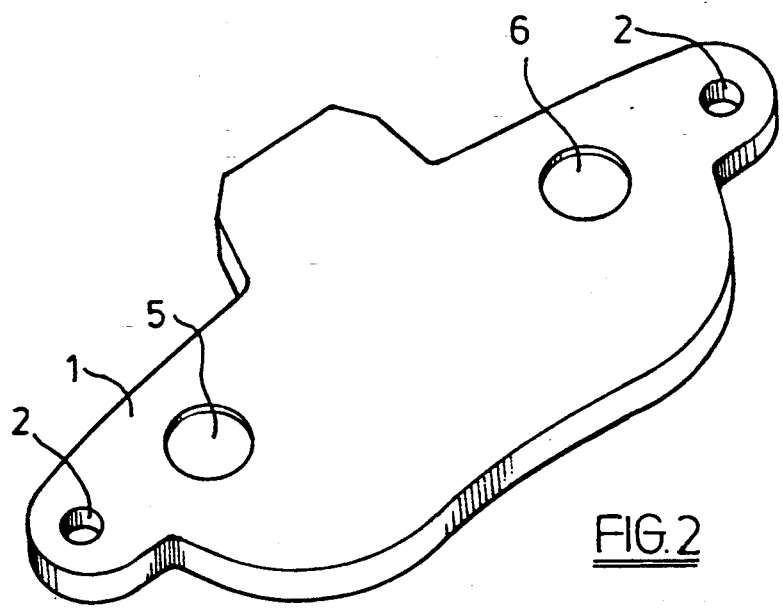

For ease of understanding, like reference numerals will be used for like parts in all five Figures. Thus in FIGS. 1 and 2, a steel disk brake backplate 1 is formed by blanking from a sheet, the press tooling being configured to generate mounting apertures 2 and a pair of circular cross-section raised abutments 3, 4 of diameter ⅜ inch and height relative to the backplate surface of about 1/16 inch. The latter are formed by displacement of metal from the rear of the backplate, as seen in FIG. 2 where the displaced metal defines a pair of corresponding shallow recesses 5, 6.

Figure 3:
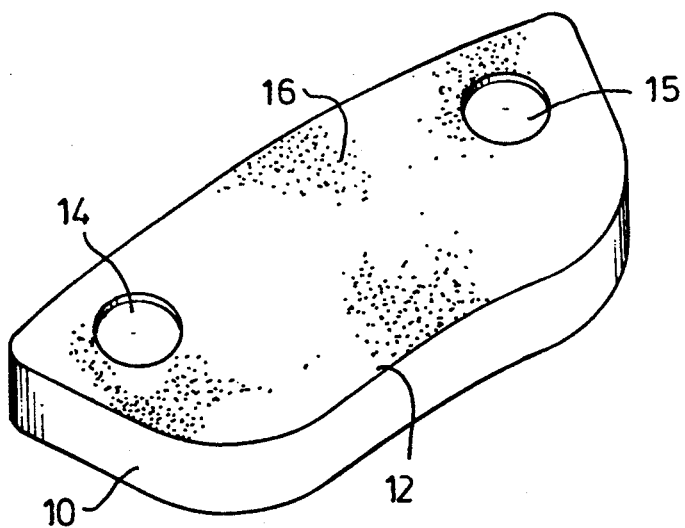
Figures 3A, 4:
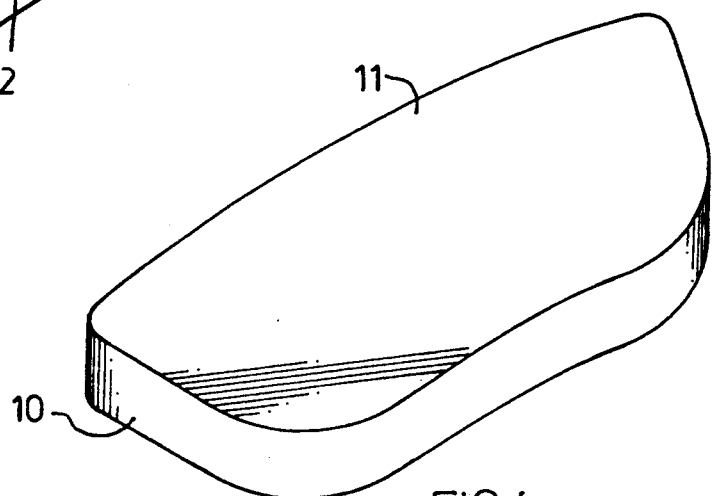
FIG. 4 is a perspective view of the opposite face of the pad of FIG. 3.

FIGS. 3 and 4 show a disk brake pad 10 of a conventional friction material composition. The latter was compounded, molded and fully cured prior to grinding off any molding flash, to leave a flat working surface 11 (FIG. 4) and a flat rear surface 12 (FIG. 3). The rear surface 12 was treated by machining a pair of recesses 14, 15 using a flat tipped drill. The recesses were of a size and depth to enable them to receive the raised abutments 3, 4. The rear surface 12 was then coated with a layer of an elastomeric adhesive 16 about 0.15 inch thick, using a four-pass coating process in which the adhesive was applied as a succession of four relatively thin layers, each of which was partially cured by heating prior to application of any other layer to build up the final thickness, as can be seen in FIG. 3A. The adhesive employed was a proprietary solvent-based, viscous synthetic nitrile rubber-phenolic resin mix, available from B.F. Goodrich under the trademark PLASTILOK.

Figure 5:
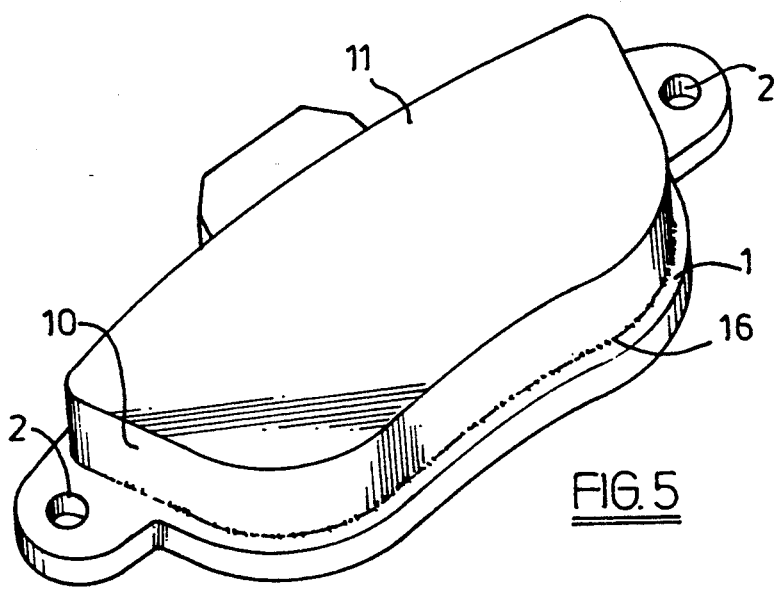
FIG. 5 is a perspective view of the assembled disk brake pad and backplate of the other Figures.

The coated but dry pad face 12 was then placed into contact with the backplate 1, so that the abutments 3, 4 were received into the corresponding recesses 14, 15. The assembled pad and backplate were then bonded together in a press, sufficient heat being applied to fully cure the adhesive. The final configuration is shown in FIG. 5, ready for installation in a disk brake caliper.

Using a conventional friction material formulation and the construction just described, noise tests were carried out using methodology laid down by the city of Los Angeles in the State of California. Compared with a conventional pad attached to a backplate by rivetting, the novel pad/backplate assembly of this invention achieved a two point reduction in noise level, indicating an acceptable noise performance. By contrast, an assembly in which conventional rivetting was used to attach the pad to the backplate was unacceptable without the use of an ancillary noise reduction shim into the test brake caliper, between the backplate and the brake operating mechanism.

What is claimed is:

1. A disk brake pad and backplate assembly comprising a metal backplate formed with a number of abutments projecting from one face thereof, and a disk brake pad of a cured friction material composition, one face of said pad being provided with recesses in which said abutments are received together with a layer of an elastomeric adhesive coating said one face of said pad and serving to bond the pad to the backplate and further wherein the abutments are formed by displacement of metal from the material of the backplate, and recesses formed by said displacement of metal in the opposite face of the backplate to that face from which the abutments project.

2. The disk brake pad and backplate assembly of claim 1 wherein said elastomeric adhesive layer is constituted by a plurality of relatively thin superposed layers with a total adhesive layer thickness less than 0.2 inch, whereby the layer of adhesive acts as a constrained damping medium between the pad and the backplate.

3. The disk brake pad and backplate assembly of claim 1 wherein the number of projecting abutments and corresponding recesses is in the range from 2 to 5.

4. The disk brake pad and backplate assembly of claim 1 wherein the recesses do not extend through the pad from one face thereof to the opposite face.

5. The disk brake pad and backplate assembly of claim 1 wherein the abutments are circular in cross-section and the corresponding recesses in said pad are generated by drilling.

* * * * *